May 19, 1925.  
J. HOLTZMAN  
1,538,554  
VEHICLE PROPELLING MECHANISM  
Filed Nov. 10, 1921  3 Sheets-Sheet 1
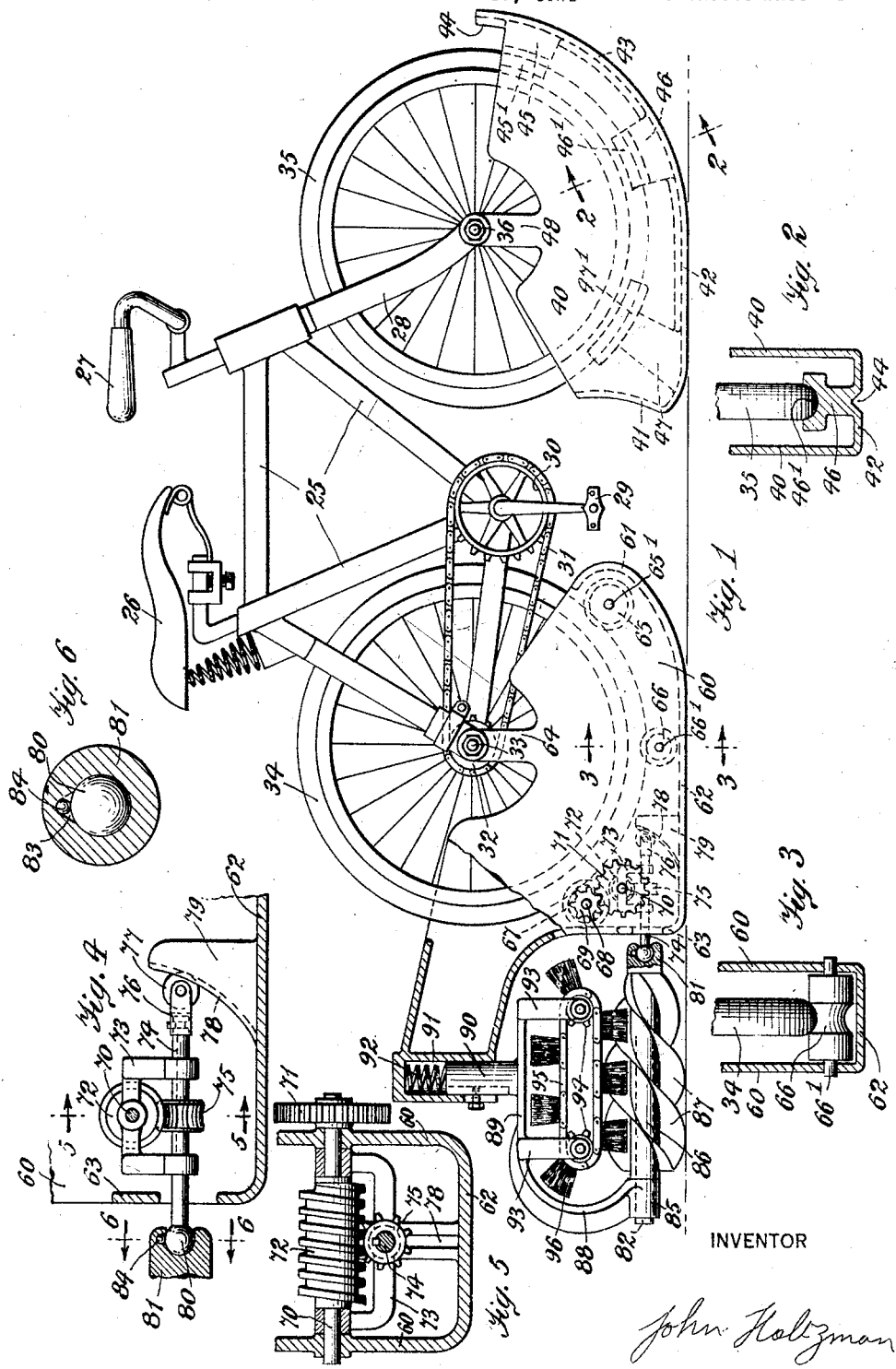
INVENTOR  
John Holtzman

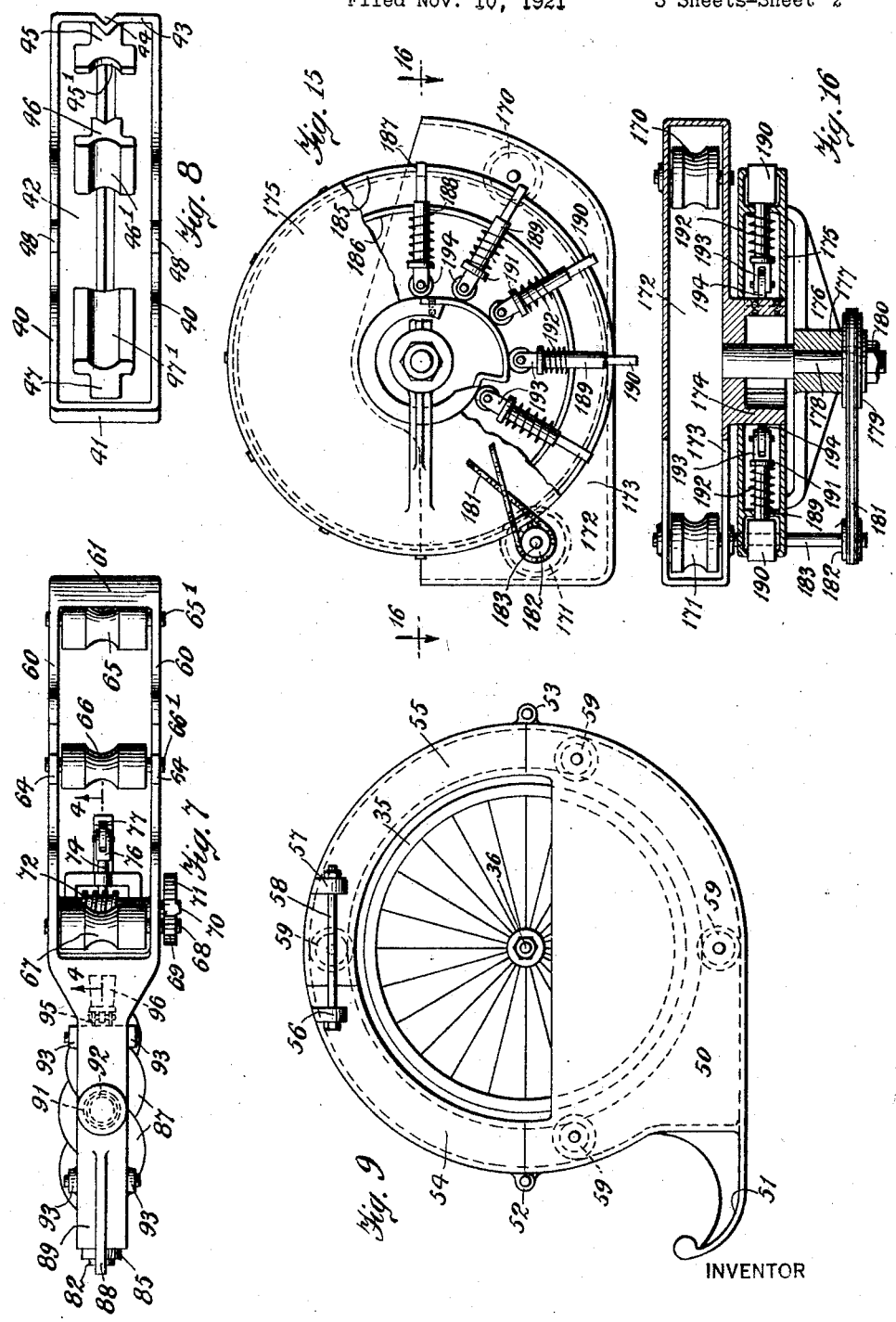

May 19, 1925.  1,538,554
J. HOLTZMAN
VEHICLE PROPELLING MECHANISM
Filed Nov. 10, 1921   3 Sheets-Sheet 3
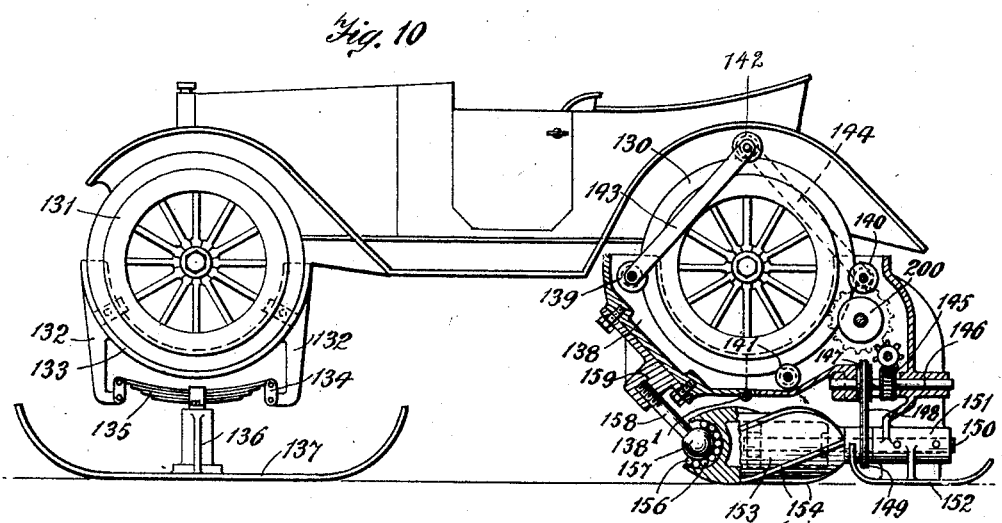
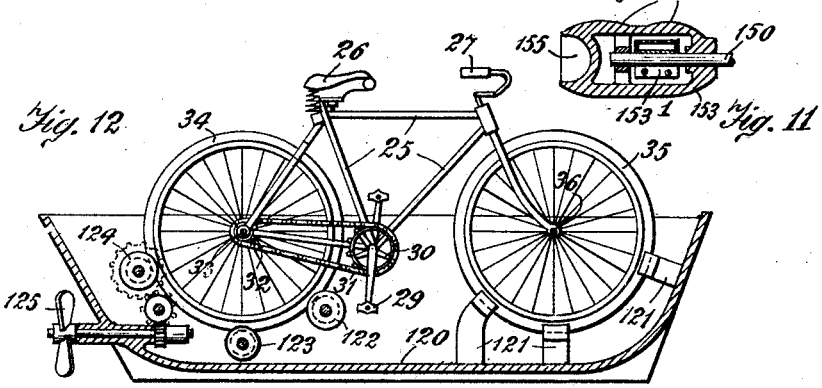
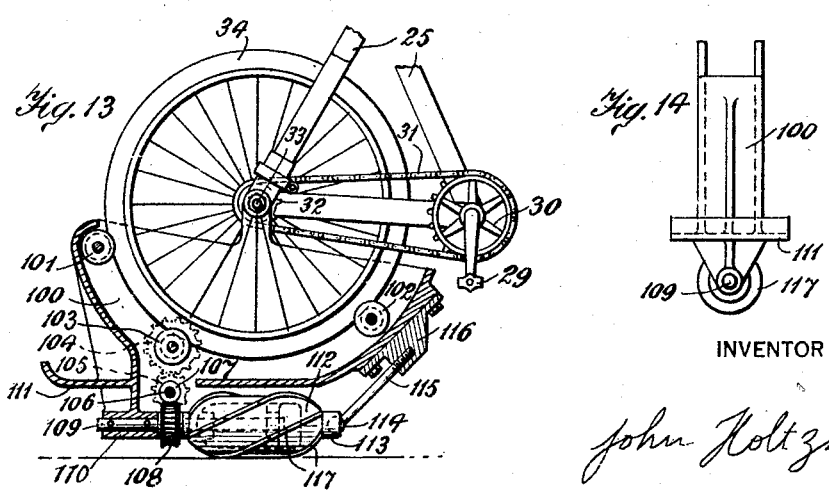
INVENTOR
John Holtzman Patented May 19, 1925.

1,538,554

UNITED STATES PATENT OFFICE.

JOHN HOLTZMAN, OF NEW YORK, N. Y.

VEHICLE PROPELLING MECHANISM.

Application filed November 10, 1921. Serial No. 514,213.

*To all whom it may concern:*

Be it known that I, JOHN HOLTZMAN, a citizen of the United States, and a resident of New York, in the county and State of New York, have invented certain new and useful Improvements in Vehicle Propelling Mechanism, of which the following is a specification.

The principal purpose of this invention is to provide means for impelling vehicles of self contained type by a gliding movement over a slippery or unstable surface, utilizing the power transmitted to the driving wheels of the vehicle to actuate the impelling mechanism.

A further object is in the provision of gliding shoes adapted for attachment to both the front and rear wheels of common type of self propelled vehicles without material change, the shoes at the rear being directly engaged with the propelling mechanism.

Another object is to provide devices for this purpose, essentially practical in their nature, simple to apply and operate and moderate in cost of construction.

These and analogous objects are attained by the novel design, construction and arrangement of parts hereinafter described and shown in the accompanying drawings, forming a material part of this disclosure, and in which:—

Figure 1 is a side elevational view of a conventional type bicycle showing the application of the invention, parts being broken away to show the construction.

Figure 2 is a fragmentary transverse sectional view taken through the front runner on line 2—2 of Figure 1.

Figure 3 is a similar view of the rear runner taken on line 3—3 of Figure 1.

Figure 4 is an enlarged fragmentary side and sectional view of the automatically adjustable transmission drive device, the section being taken substantially on line 4—4 of Figure 7.

Figure 5 is a transverse sectional view taken on line 5—5 of Figure 4.

Figure 6 is a similar view taken on line 6—6 of Figure 4.

Figure 7 is a plan view of the rear shoe as shown in Figure 1.

Figure 8 is a similar view of the front shoe.

Figure 9 is a side elevational view of a modified form of front runner and wheel guard combined.

Figure 10 is a view similar to Figure 1 illustrating a modified form of the driving device as applied to an automobile, the mechanism being partially shown in section.

Figure 11 is a longitudinal sectional view showing details of construction.

Figure 12 is a side view of a bicycle as used to propel a boat, the latter being shown in section.

Figure 13 is a fragmentary side view showing a modified form of driving mechanism as engaged with a bicycle.

Figure 14 is a rear elevational view of the same.

Figure 15 is a side elevational view of an alternative type of runner drive as used on snow, parts being broken away to show the construction.

Figure 16 is a horizontal sectional view taken on line 16—16 of Figure 15.

Referring to the drawings in detail, particularly Figures 1, 12 and 13, the numeral 25 designates in general the frame of a bicycle, the same supporting a seat 26 adjacent the handle bars 27 by which the front forks 28 are controlled.

Pedals 29 actuate the sprocket 30 over which is trained a chain 31 conveying rotary motion to the driving sprocket 32, on the rear axle 33, alongside the rear driving wheel 34, both being mounted between the rear forks of the frame.

The front shoe (see Figures 1, 2 and 8) is 36 carried by the front forks 28 and is steered in the usual manner by manipulating the handle bars 27, the construction being of common type throughout, forming no part of the invention but used to illustrate its application.

The front shoe (see Figures 1, 2 and 8) is composed of a pair of spaced side plates 40, connected at the back 41 and along the level bottom 42 which merges into an upturned arcuate front 43 extending to about the height of the center of the wheel which the shoe encases.

A central angular depression 44 is formed in the front and bottom elements acting to stiffen the same.

A lug 45 is fixed in the front element 43 to extend inwardly and formed with an enlarged head containing a recess 45′ suited to receive the tire of the wheel 35; other similar lugs 46 and 47 having recesses 46′ and 47′ extend in from the bottom of the shoe to support and guide the wheel which is held firmly therein by means of strap-like projections 48 extending integrally up from the side plates 40 and provided with openings to receive the extending ends of the axle 36, the same being held by the nuts usually provided.

In Figure 9 a modification of the front shoe is shown that more completely encloses the wheel and protects its entire periphery; it is also constructed in such manner that it can be readily applied or removed without interfering with the axle.

This structure comprises a pair of side plates 50 connected in spaced relation by front, rear and bottom plates and is provided with an upturned rear extension 51 of the bottom plate.

The curved raised portions of the side plates extend in a plane about equal with the wheel center and on the front and rear plates are formed lugs 52 and 53 acting as hinge members to pivotally unite the upper guard casing elements 54 and 55, having lateral lugs 56 and 57, through which pass clamp bolts 58.

Journalled between the side plates 50 and guards 54 and 55 are a plurality of rollers 59, their faces being concaved to suit the wheel against which they are drawn by the clamp bolts 58 to any desired extent.

The preferred type of rear shoe is shown in Figures 1, 3 and 7 and like the front shoe, consists of a pair of side plates 60 connected by a front runner plate 61, merging into the main or bottom member 62 upturned at the rear 63.

Straps 64, formed with the side plates, engage the rear axle 33 as before described.

Extending transversely between the side plates 60, at the front, is a concave faced roller 65 mounted on pintles 65′, another roller 66 on pintle 66′ being directly below the axle 33, and at the rear, is another like roller 67 fixed on a spindle 68 passing thru the side plates and having secured on one end a spur pinion 69.

These rollers are adapted to receive the tire of the wheel 34, and as the latter is caused to rotate by the driving mechanism of the vehicle, the rollers will also revolve and drive the pinion 69.

Another spindle 70 is journalled in the casing sides 60, its extending end having secured to it a spur gear 71 in mesh with the pinion 69 and a worm 72 is fixed on the spindle between the forks of a yoke 73 which are rotatable on the spindle.

Rotatably mounted on the yoke, longitudinally of the shoe, is a shaft 74 having keyed to it a worm gear 75 operatively engaged by the worm 72.

At the inner end of the shaft is a fork 76 in which is rotatably mounted a disc or roller 77 engaging a slot 78 formed in the curved face of a raised projecting guide plate 79 of the shoe 62, the face and slot being curved to a radius having its axis at the center of the shaft spindle 70.

Thus due to the mounting of the yoke and arcuate guiding of the shaft roller, the shaft may be tilted from a horizontal plane as becomes necessary in its operation.

The opposite, outer end of the shaft 74 passes through a vertical slot in the rear plate 63 of the shoe and has secured to it a sphere 80 loosely within a seat formed within the enlarged head 81 of a shaft 82, the head being closely adjacent the rear plate 63 and central of the shoe.

Formed in the head 81 is a recess 83 having angularly inclined walls which are open to the seat recess and are adapted to receive a hardened steel ball 84 impinging on the surface of the sphere 80 in such manner as to act as a clutch and normally transmit rotary motion from the shaft 74 to the shaft 82, irrespective of slight differences in the direction of their axial planes.

Secured to the shaft 82, between the head 81 and an outboard support 85, is an elongated sleeve 86 having on its periphery a plurality of relatively thin helical vanes 87, their outer edges being normally in the plane of the glide plate or runner 62.

The outboard support 85 is carried by a curved arm 88 extending from a frame 89, having on its upper surface a stud 90 slidable in a vertical tubular socket 91 and normally pressed down by a coiled compression spring 92 contained in the upper part of the socket.

The shoe side plates 60 are extended rearwardly and, together with top and bottom casing plates, engage and support the socket 91.

Pairs of side lugs 93 extend down from the ends of the frame 89 and carry between them sprockets 94 over which is trained an endless chain 95, having fixed a plurality of brush tufts 96 extending in such manner as to engage the helical blades 87 and by them the chain is driven, the movement of the brushes sweeping the spaces between the blades free of any accumulations.

Thus in operating the vehicle in snow the propeller, comprised of the blades, being frictionally driven by the rear wheel, is free to move limitedly up and down and is kept in a clean effective operating condition.

In Figure 13, a modification is shown in which the rear driving wheel 34 is mounted directly over the propeller, the weight of the vehicle aiding in obtaining a tractive effect.

In this device a casing, generally designated 100, is formed of side plates substantially closed at the front, rear and bottom, the side plates having between them rollers 101 and 102 at the front and rear made in the manner previously described and the plates are attached to the axle of the vehicle by the same type of strap connections.

The intermediate friction roller 103 has fixed to it a spur gear 104 meshing with a pinion 105 fixed on a transverse spindle 106 journalled in the side plates and mounting a worm engaging a worm gear 108 rotatable on a shaft 109 fixed in a horizontal plane in a bearing 110, carried by the casing below its bottom plate 111.

Driven by the worm gear is a cylinder 112 having rounded ends and a forwardly extending hub 113 containing a spherical seat receptive of a sphere 114 fixed on the end of a bar 115 adjustably threaded into a support block 116 bolted to the angular front end of the casing 100.

The cylinder 112 is also partially supported by the front end of the shaft 109 and has upon its exterior a series of helical blades 117 adapted to advance the vehicle as the wheel 34 is rotated.

This arrangement is well adapted to be used on ice or hard snow, the blade being effective in securing propulsions.

Figure 12 shows a boat, generally designated as 120, in which is a bicycle, its front wheel 35 resting on supports 121 extending from the front and bottom, and the rear or drive wheel 34 rests in concave faced rollers 122, 123 and 124, the latter driving a train of gears which actuate the propeller 125 at the rear of the boat in a manner which will be understood from the foregoing.

Figure 10 illustrates a gliding and propelling mechanism as applied to vehicles of the automobile type, having a pair of driving wheels 130 at the rear, and dirigible wheels 131 at the front.

Both pairs of wheels are held in raised position, those at the front resting in pairs of opposed supports 132 connected by a partial band 133 to which the wheels are individually and securely clamped.

The lower ends of the supports are provided with pivoted links 134 between which are extended, semi-elliptical springs 135, their centers being secured to uprights 136 mounted on the skid-like, gliding or runner elements 137 at points slightly in advance of their centers.

It may also be noted that the housing or casing shown in Figure 9 may be substituted with equally effective results.

Thus each of the front wheels are glidingly supported and free to be directed by the steering mechanism of the vehicle in the usual manner.

The rear wheels 130 rest in a rigid concave frame or casing 138, made substantially in the manner previously described and having support rollers 139 and 140 impinging against the wheel at opposite points, level with the axle. A smaller roller 141 is located below the wheel at a point rearward of the center and a fourth roller 142 is held between opposed links 143 and 144, on the upper surface of the wheel, the links being pivoted on the axis of the respective rollers 139 and 140, so that by releasing one of these pivots, the casing elements can turn outwardly along the hinge 138' connecting at the bottom.

The roller 200 actuated by a pinion fixed alongside the roller 140 as in the manner before described drives a train of gears, as shown, terminating in the worm wheel 145 on the shaft 146, this shaft being in a horizontal plane and having fixed to it a pulley 147 driving a belt 148 to communicate rotary motion to another pulley 149 fixed on a shaft 150.

The shaft 150 is parallel to the shaft 146 and is rotatably mounted in a bearing 151 raised from the relatively short runner 152.

The opposite, front end of the shaft 150 enters axially into a propeller 153 having helical blades 154 in such manner as to rotate the same, and contains a heater 153'.

The front end of the propeller is formed with a cup shaped cavity 155 adapted to receive a plurality of balls 156 acting as anti-friction elements for the sphere 157 formed on the end of a bar 158, screw threaded, for adjustment, at its opposite end into a block 159 bolted to the front portion of the casing 138.

In the modified form of drive shown in Figures 15 and 16, a wheel (not shown) rests on concave faced rollers 170 and 171 rotatable in a casing 172 secured to the axle or other parts of the vehicle in any convenient manner.

The outer plate element 173 of the casing has a laterally extending hub 174 formed exteriorly as a scroll cam and circumjacent the cam is a cylindrical casing 175 supported by arms 176 radiating from the hub 177 rotatable near the end of the axle 178.

The extreme end of the axle has fixed to it a pulley 179 held together by the nut 180, the pulley being driven by a belt or chain 181 from another pulley 182 fixed on the end of a spindle 183 driven by the roller 171, thus causing the casing 175 to constantly rotate as the vehicle wheel is actuated.

The casing 175 is formed with a rim 185 and an annular concentric inner ring 186. The rim 185 is formed with a plurality of equally spaced transverse slots 187 and the ring 186 contains registering openings 188 slidably receiving round bars 189 having flattened, paddle shaped extremities 190 extensible through the slots 187.

Collars 191 are fixed to the bars and abutting the collars and ring 186 are springs 192 encircling the bars, forcing them radially inward or toward the fixed cam 174.

The inner ends of the bars are formed into forks 193 in which are freely rotatable rolls 194 impinging against the cam due to the effect of the springs.

In operation, the vehicle wheel being revolved, rotary motion is transmitted to the casing 175 so as to rotate it around the cam 174, and as the latter is fixed in a definite position, the paddle-like elements 190 will be projected to their fullest extent when directly below the axle and gradually retracted during the succeeding quarter of casing revolution.

Thus the vehicle will be urged forward in a forcible and practical manner over unstable surfaces, as snow or mud.

While certain preferred embodiments of this device have been shown and described, it will be understood that changes in the form, arrangements, proportions, sizes and details thereof, may be made without departing from the scope of the invention as defined by the appended claims.

Having thus described my invention, what I claim as new and desire to secure by Letters Patent, is:—

1. Propelling means for wheeled vehicles comprising a casing for the driving wheel, rollers in said casing frictionally engaging the periphery of the wheel and rotated thereby, a gear train driven by one of said rollers, a spindle extending rearwardly of said casing driven by said gear train, a helical propeller connected to said spindle, and a housing over said propeller carried by said casing.

2. Propelling means for wheeled vehicles comprising a casing for the driving wheel, rollers in said casing frictionally engaging the periphery of the wheel and rotated thereby, a gear train driven by one of said rollers, a spindle extending rearwardly of said casing driven by said gear train, a helical propeller connected to said spindle, a frame supporting the rear end of said propeller, said frame being carried by said casing, and means for brushing the blades of said propeller as it rotates.

3. Propelling means for wheeled vehicles comprising a casing for the driving wheel, rollers in said casing frictionally engaging the periphery of the wheel and rotated thereby, a gear train driven by one of said rollers, a spindle extending rearwardly of said casing driven by said gear train, a helical propeller connected to said spindle, a frame supporting the rear end of said propeller, said frame being carried by said casing, an endless conveyor mounted in said frame, and a plurality of brush tufts fixed on said conveyor, said tufts entering between the blades of said propeller whereby the conveyor is actuated and the propeller cleansed of accumulations.

4. Propelling means for wheeled vehicles comprising a casing for the driving wheel, rollers in said casing frictionally engaging the periphery of the wheel and rotated thereby, a gear train driven by one of said rollers, a spindle extending rearwardly of said casing driven by said gear train, a helical propeller, a universal joint between said propeller and said shaft, a housing for said propeller, movable brushes in said housing, connections between said housing and said casing, and means in said connection permitting said housing and attached parts to move vertically.

5. Propelling means for wheeled vehicles comprising a gliding shoe attached to the wheel axle, concave faced rollers in said shoe adapted to receive the wheel, a gear train driven by one of said rollers in frictional contact with the wheel, and an inclinable helical propeller actuated by said gear train.

6. In combination with a vehicle having a casing extending rearwardly and below the frame thereof, a propeller for actuating the vehicle, said propeller being connected to the casing, a housing attached to said casing at the rear thereof, and brush elements mounted in said housing, actuated by said propeller and adapted to clean the blades thereof.

7. Propelling means for vehicles comprising a housing fixed on the vehicle, a screw propeller journaled in said housing, a shaft having a universal joint operatively connecting with said propeller, a gear on the shaft, a worm in engagement with said gear, and friction means actuated by the wheel of said vehicle for drawing said worm.

8. In combination with a vehicle having a traction wheel, a longitudinally disposed screw propeller, means driven by frictional contact with said wheel to transmit rotary movement to the propeller, and means for supporting said propeller at each end thereof rearward of said wheel.

9. A propelling means for wheeled vehicles comprising in combination, a traction wheel having a yieldable periphery, a power means to drive said wheel, a frame attached to said wheel and solely supported by the same, a driving roll in frictional engagement with the periphery of the traction wheel, and a propeller in said frame connected to the driving roll, for actuation thereby to move said vehicle.

10. In combination, a wheeled vehicle having a traction wheel, a self contained power means to drive said wheel, a runner frame connected to said wheel, a pair of driving rolls in said frame in frictional contact with the wheel, propelling means rotatable in said frame to move the vehicle, and flexible connections operatively engaging between said rolls and the propelling means.

11. In propelling means for wheeled vehicles having a self-contained power plant, a front wheel, a runner sled attached to said vehicle, a rear wheel having a yieldable periphery and a propelling mechanism frictionally associated with said rear wheel and solely supported by the periphery of the wheel to slidably drive the vehicle.

12. In propelling means for wheeled vehicles having a self-contained power plant, a traction wheel having a yieldable periphery and a screw-propelling mechanism actuated by said traction wheel to move the vehicle slidingly along the road.

13. In a propelling device for wheeled vehicles having in combination a front wheel, a runner sled attached to said vehicle, a rear wheel, a removable shoe attached to said rear wheel, a helical propeller mounted on said shoe to contact with the surface on which the runner rests, and means actuated by said rear wheel to drive said propeller.

14. In propelling means for wheeled vehicles having a self contained power plant, a pair of traction wheels having a yieldable periphery and actuated by said power plant, a frame removably attached to the wheels of the vehicle, a pair of rolls journaled in said frame and having frictional contact with the yieldable periphery of said vehicle wheels, and adapted to carry the weight of the rear part of the vehicle, and a propeller actuated by said rolls adapted to propel the vehicle on ice or snow.

15. In propelling means for wheeled vehicles having in combination of a self contained power plant, a pair of traction wheels driven by the same, mechanism actuated by said traction wheels to effect a bodily movement of the vehicle and said mechanism including a frame, movable elements in the frame and actuated by the traction wheels of the vehicle, a worm and gear in operative connection with the elements and said elements bearing all the weight of the rear part of the vehicle.

16. In a vehicle propelling device, comprising a prime mover, a casing, a shaft extending rearwardly of the same, a helical propeller connected to said shaft, shock absorbing means mounted in the casing for compensating the up and down movement of the propeller, and means to drive the same.

17. In a sled vehicle propelling device comprising a sled runner, a prime mover mounted on said runner, a shaft extending rearwardly of the same, means to drive the shaft, a helical propeller mounted on the shaft, and a spring between said runner and propeller for compensating up and down movement of the same.

18. In a sled vehicle propelling device comprising a sled runner, a shaft extending rearwardly of the same, means to drive the shaft, a helical propeller mounted on the shaft, and a spring between the sled runner and propeller to press the same to the ground below the level line of the runner.

In testimony whereof I have signed my name to this specification.

JOHN HOLTZMAN.